March 7, 1961 F. SCHWEPKE 2,973,555
ROTARY PRESS FOR FABRICATION OF BUTTONS
AND PLASTIC ARTICLES
Filed Sept. 9, 1955 12 Sheets-Sheet 1

INVENTOR.
Franz Schwepke
BY his attorneys
Howson and Howson

INVENTOR.
Franz Schwepke
BY his attorneys
Howson and Howson

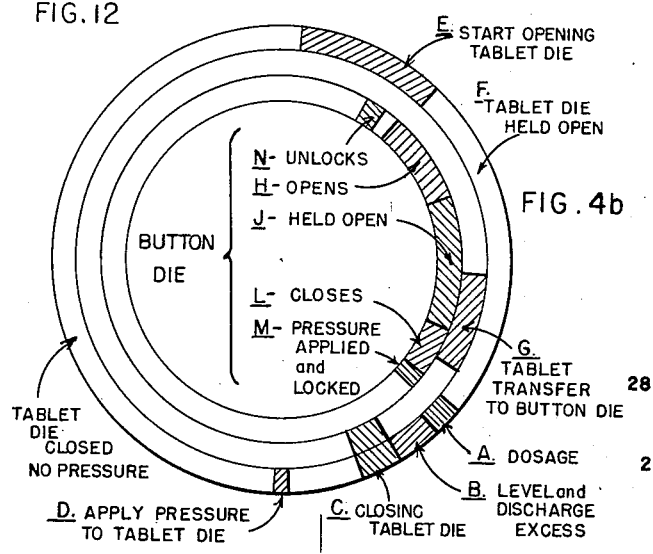
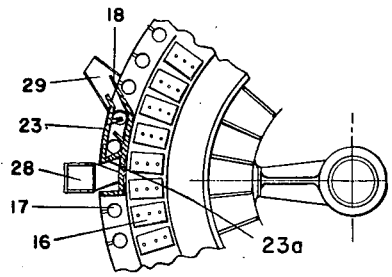
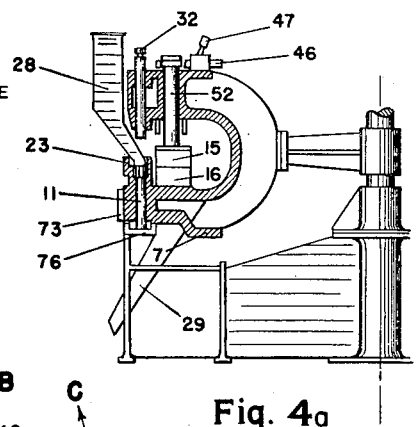
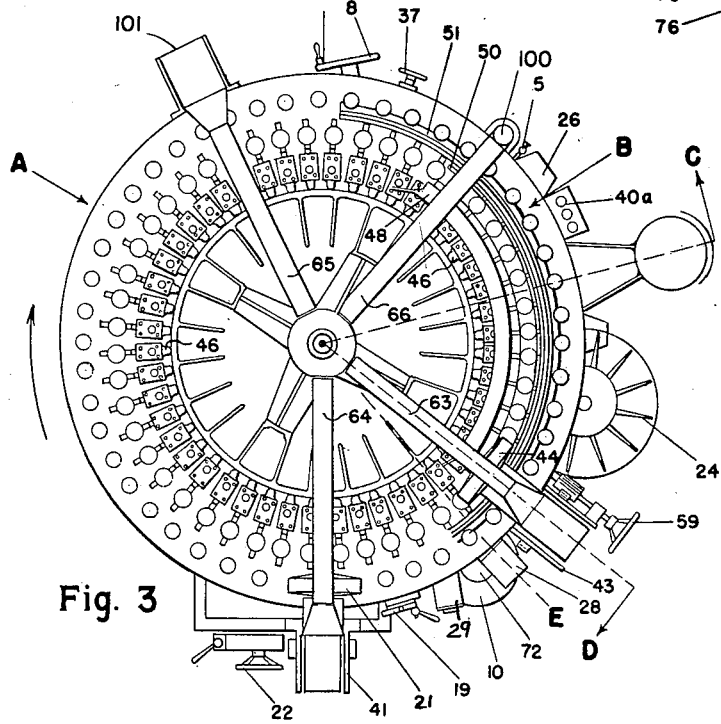

March 7, 1961

F. SCHWEPKE 2,973,555

ROTARY PRESS FOR FABRICATION OF BUTTONS AND PLASTIC ARTICLES

Filed Sept. 9, 1955

INVENTOR.
FRANZ SCHWEPKE
BY his attorneys
Howson and Howson.

March 7, 1961

F. SCHWEPKE 2,973,555

ROTARY PRESS FOR FABRICATION OF BUTTONS AND PLASTIC ARTICLES

Filed Sept. 9, 1955

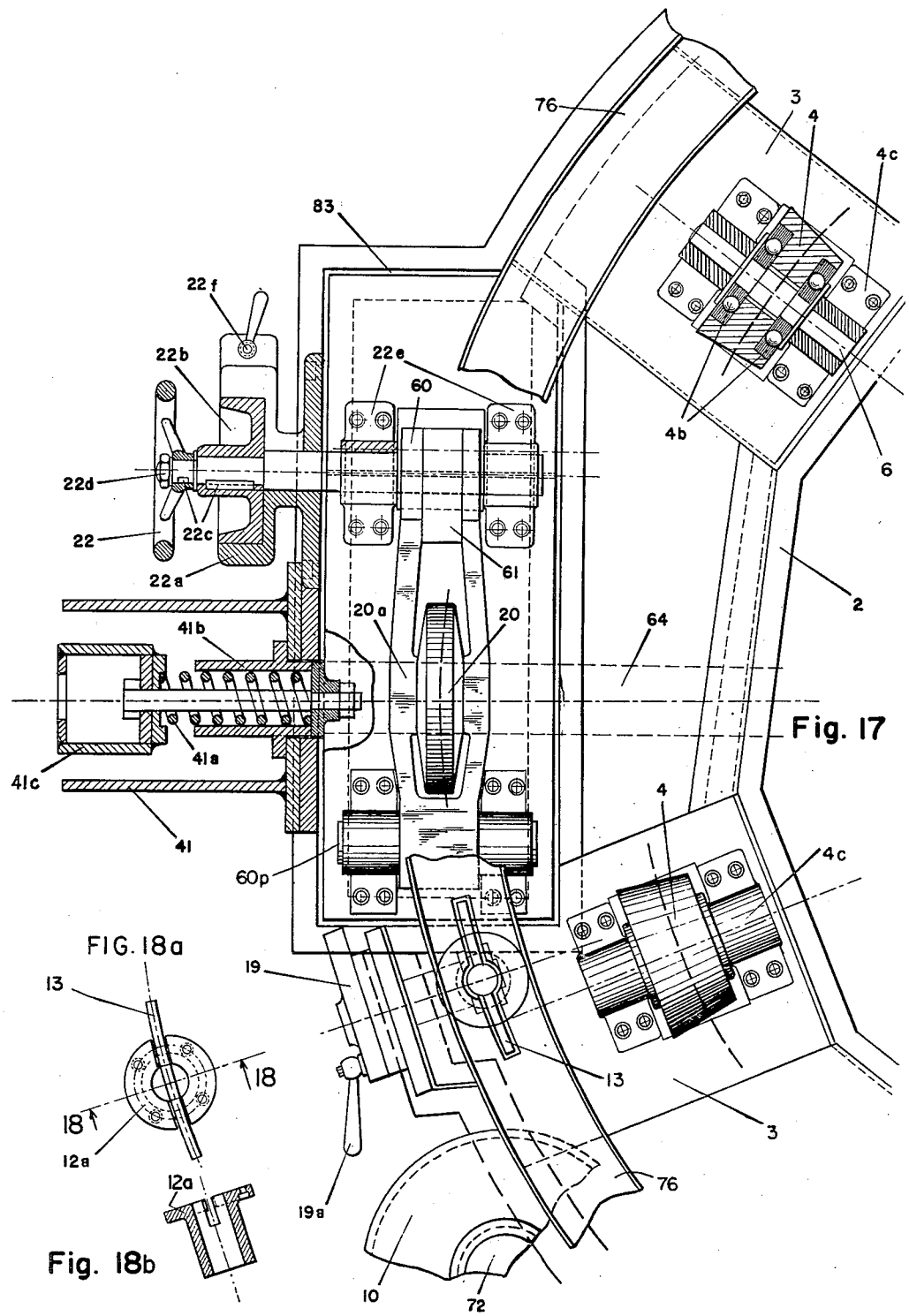

March 7, 1961

F. SCHWEPKE 2,973,555

ROTARY PRESS FOR FABRICATION OF BUTTONS AND PLASTIC ARTICLES

Filed Sept. 9, 1955

March 7, 1961  F. SCHWEPKE  2,973,555
ROTARY PRESS FOR FABRICATION OF BUTTONS
AND PLASTIC ARTICLES
Filed Sept. 9, 1955  12 Sheets-Sheet 11
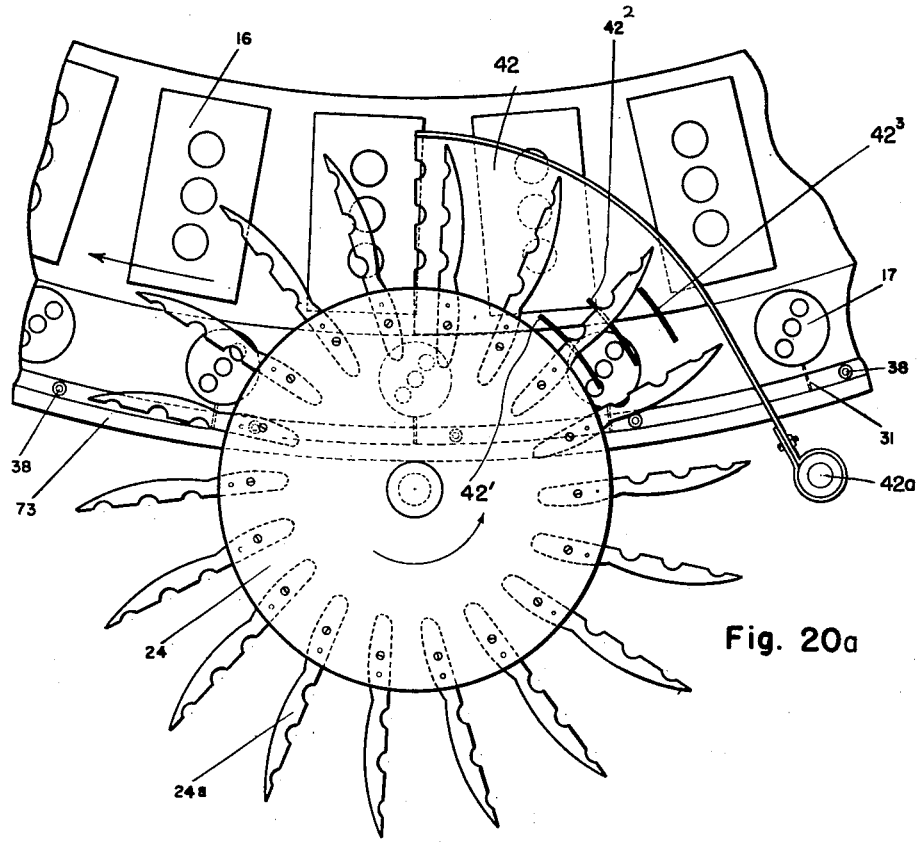
Fig. 20a
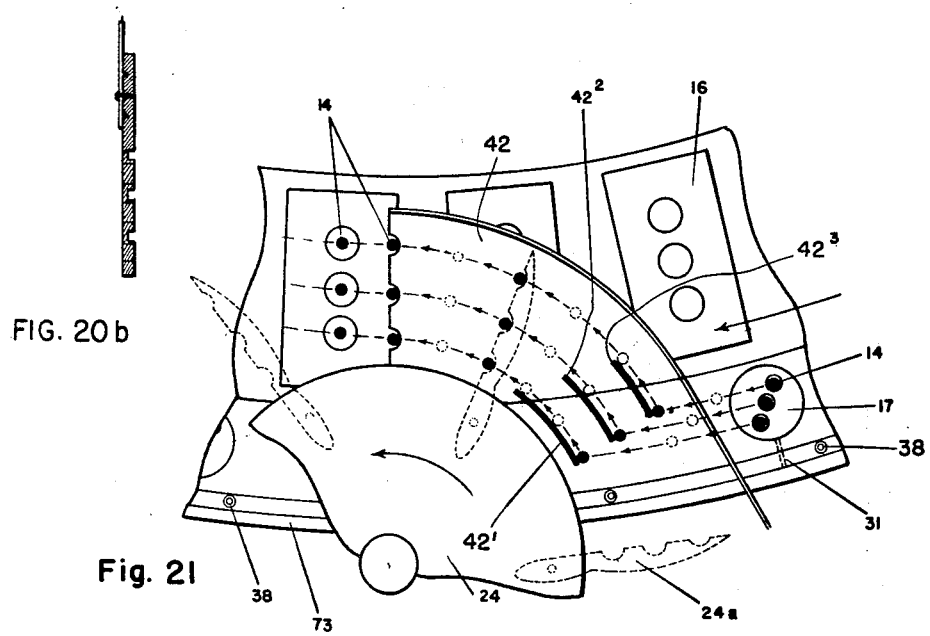
FIG. 20b
Fig. 21

March 7, 1961 F. SCHWEPKE 2,973,555
ROTARY PRESS FOR FABRICATION OF BUTTONS
AND PLASTIC ARTICLES
Filed Sept. 9, 1955 12 Sheets-Sheet 12
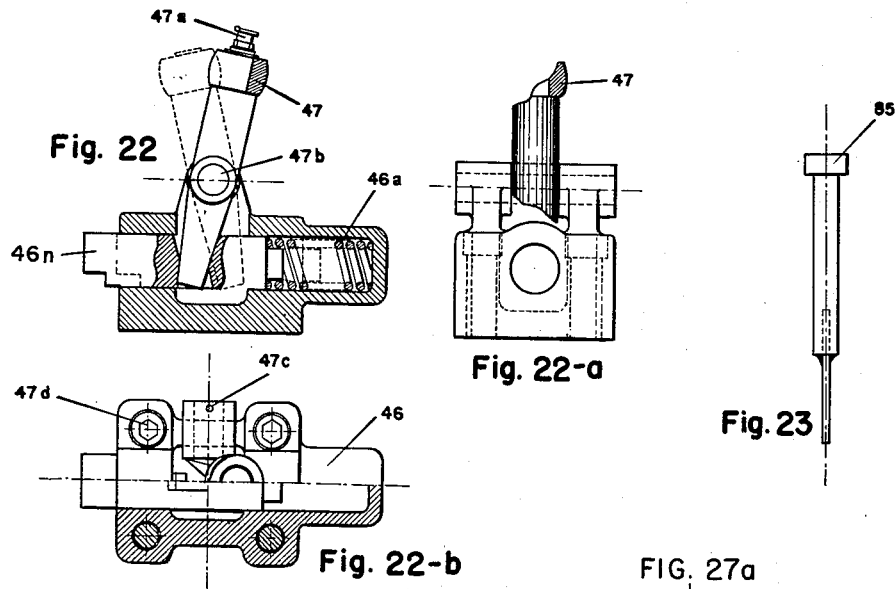
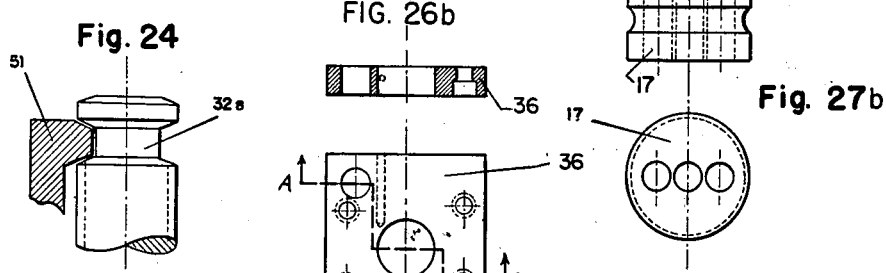
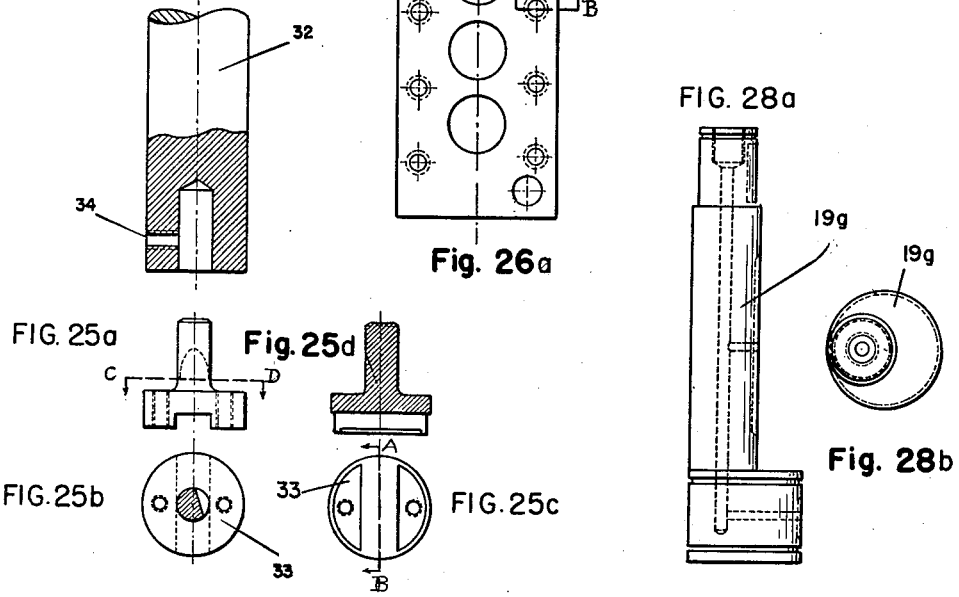

United States Patent Office 2,973,555
Patented Mar. 7, 1961

2,973,555
ROTARY PRESS FOR FABRICATION OF BUTTONS AND PLASTIC ARTICLES

Franz Schwepke, Hamburg, Germany, assignor to Agustin Mesa, Bogota, Colombia

Filed Sept. 9, 1955, Ser. No. 533,436

25 Claims. (Cl. 18—20)

This invention relates to a machine for making buttons and other articles from plastic materials, particularly synthetic plastic materials. More particularly, it relates to an automatic machine for making such articles of such materials wherein a tablet is first produced from powder and the tablet is subjected to heat and pressure to form the article.

Heretofore, attempts to provide machines of the type above mentioned have been complicated and difficult to keep in operation and have created problems in manufacturing and have been subjected to continuous disruptions of service.

Therefore, it is an object of the invention to provide an automatically operated machine for automatically and continuously forming tablets from plastic molding powder which will deliver the tablets to article forming dies which will discharge the finished article. Related objects are to build such a machine with simple component parts and to adapt the machine for easy lubrication whereby operators with only elementary knowledge may adjust and repair the machine easily to keep it in service.

Another object is to adapt the principles of the invention to a rotary machine which can therefore operate continuously and smoothly.

Other objects and advantages of the invention will become apparent as it is described in connection with the accompanying drawings.

In the drawings:

Fig. 3 is a plan view of the machine.

Fig. 4a is a detail elevational section view along line E of Fig. 3 up to the center of the machine.

Fig. 4b is a plan view of the portion of the mechanism shown in Fig. 4a.

Fig. 11b is a side elevation view of the parts shown in Fig. 11a.

Fig. 12 is a pictorial diagram of the working processes of the machine.

Fig. 15b is an end view partly in vertical section of the parts in Fig. 15a.

Fig. 16b is a vertical section view along line 16—16 of Fig. 16a.

Fig. 17 is a plan view partly in horizontal section of the bottom quarter of the parts shown in Fig. 6 on a larger scale.

Fig. 18a is a detail view showing in plan the dosage device.

Fig. 18b is a section view along line 18—18 of Fig. 18a of one of the members of Fig. 18a.

Fig. 19b is a fragmentary detail view showing in elevation and partly in section along line 19b—19b of Fig. 19a the parts illustrated in Fig. 19a.

Fig. 20a is a detail plan view of the tablet transporter.

Fig. 20b is a detail view showing in plan and in longitudinal section a finger of the transporter.

Fig. 21 is a view similar to Fig. 20a showing diagrammatically the carrying of the tablets to the press mold.

Fig. 22 is a detail view of the automatic lock for the embodying device.

Fig. 22a is an end view of the parts shown in Fig. 22.

Fig. 22b is a plan view partly in section of the parts shown in Fig. 22.

Fig. 23 is a detail view showing the ejecting punch in side elevation.

Fig. 24 is a detail view showing in elevation and partly in section the push rod for the upper tablet die and its guide cam.

Fig. 25a shows in elevation the holder for the upper tablet die.

Fig. 25b is a horizontal section along line CD of Fig. 25a.

Fig. 25c is a bottom plan view of the part illustrated in Fig. 25a.

Fig. 25d is a vertical section along line AB of Fig. 25c.

Fig. 26a is a plan view of the pressure mold.

Fig. 26b is a section view along line AB of Fig. 26a.

Figs. 27a, 27b are side elevation and plan views, respectively, of the bottom tablet die.

Figs. 28a and 28b are side elevation and plan views, respectively, of the eccentric, for the dosage device.

Figure 1:
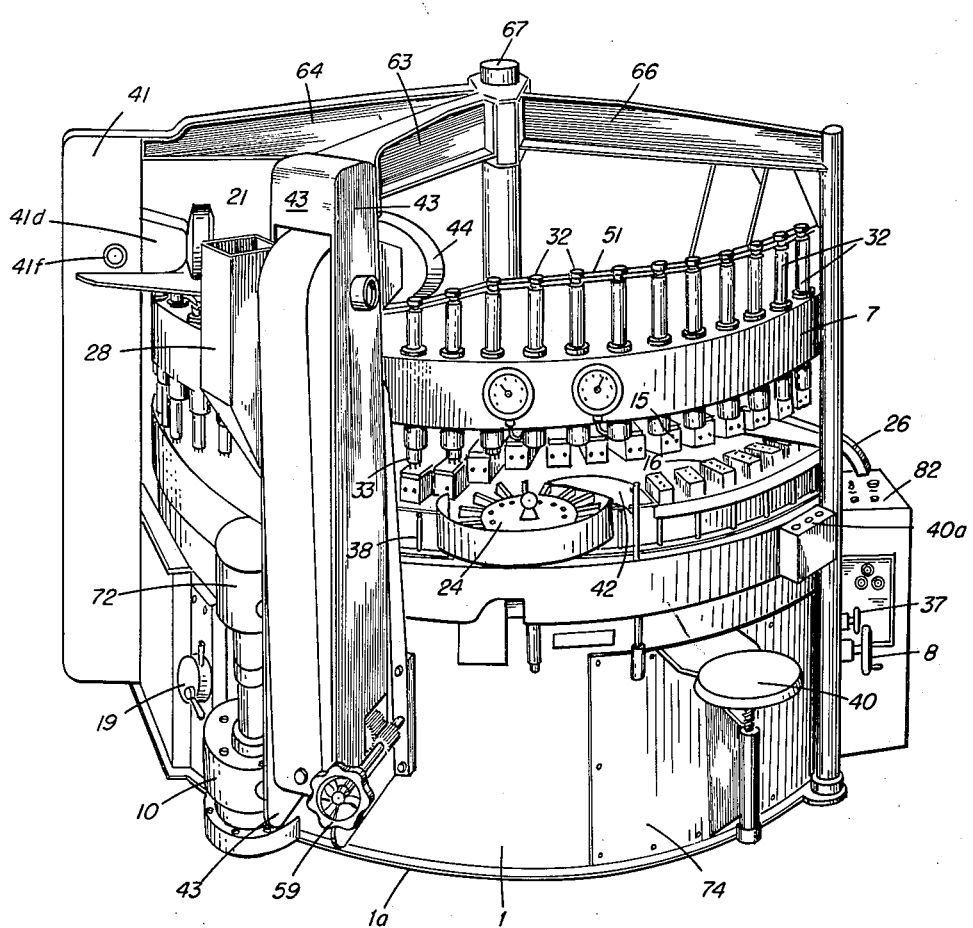
Fig. 1 is a perspective view of a machine embodying the invention.

The machine, which as a whole is shown in perspective in Fig. 1, is equipped with devices which perform a series of related functions and operations, namely:

(1) Feeding of plastic molding powder to tablet forming dies continuously in regulated amounts or dosages;

(2) Forming tablets by pressing the powder between dies which are arranged in a circle so as to successively approach a feeding station and continuously receive a predetermined dosage of powder;

(3) Ejecting the tablets from the tablet forming dies and transporting them regularly in predetermined paths at a controlled rate in succession to article-forming dies;

(4) Forming buttons or other articles by pressing the tablets between the article-forming dies while the tablets are subjected to heat, as the tablets are successively placed between the article-forming dies;

(5) Removing the formed articles from the article-forming dies and discharging them through a chute into a receptacle adjacent the machine.

The invention may be more readily understood by describing the dies and their operation before the feeding and dosage control of the molding powder is described.

GENERAL STRUCTURE OF THE MACHINE

The machine parts are supported from an annular base structure and also from a central pillar 67, both of which rest on the floor or a foundation.

Figure 2:
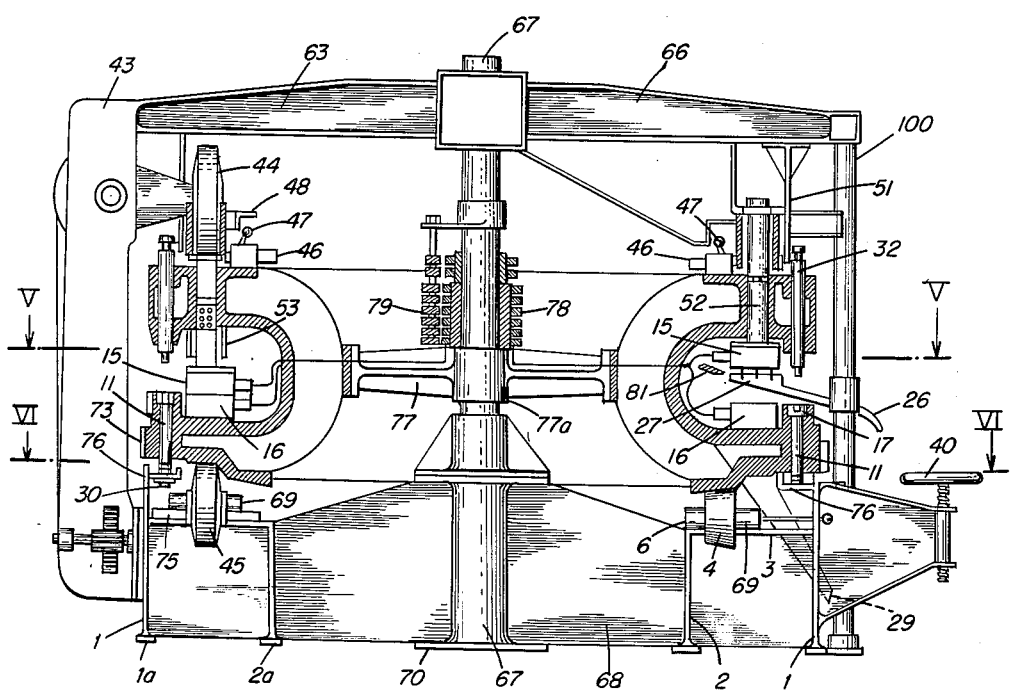
Fig. 2 is a vertical section view of the machine along line C—D of Fig. 3.
Figure 5:
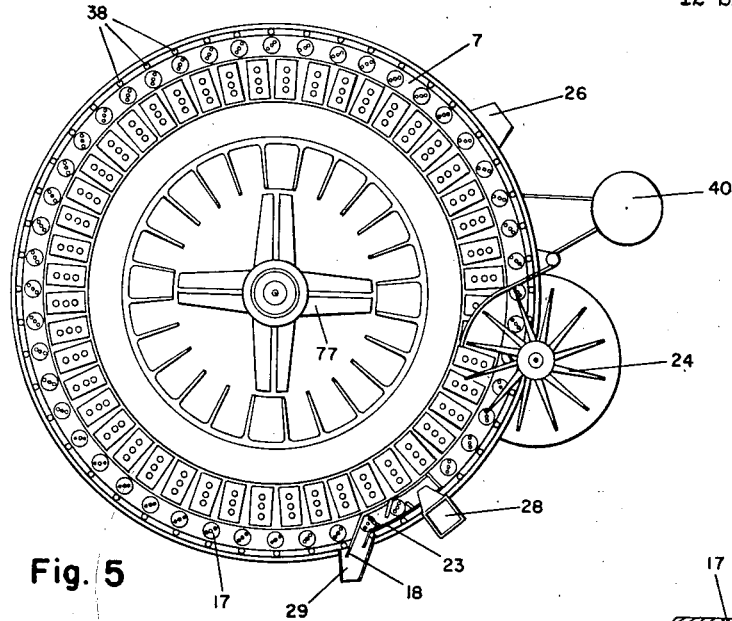
Fig. 5 is a sectional plan view along line V—V of Fig. 2.
Figure 19B:
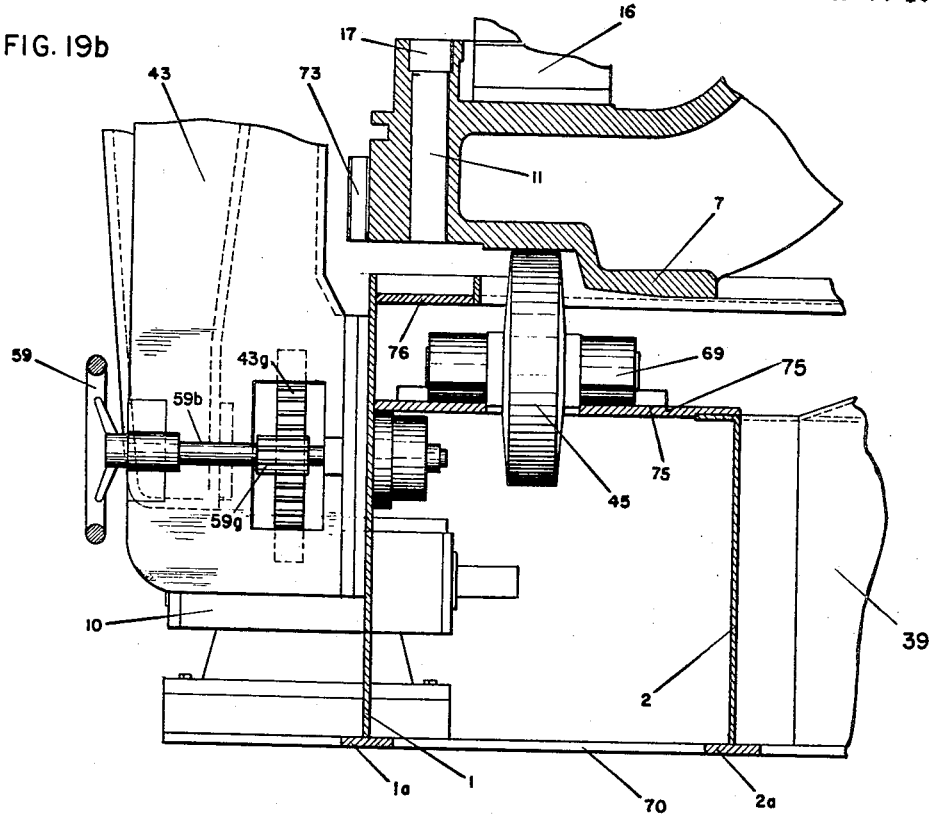
Figure 19A:
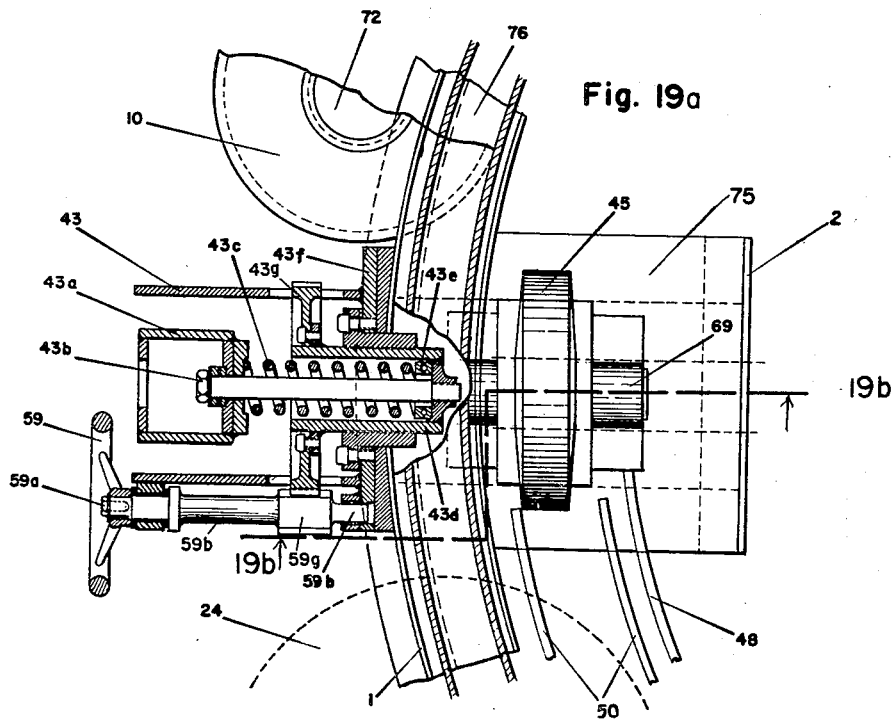
Fig. 19a is a fragmentary detail view showing the pressure regulator in plan and partly in horizontal section.

The base structure comprises a vertically cylindrical external wall 1 welded or otherwise affixed to a narrow generally annular horizontal flat plate 1a resting on the floor (Figs. 1, 2, 19a and 19b). The external wall 1 is joined to a twelve-sided vertical polygonal wall 2 by six horizontal plates 3 (Fig. 6) which are attached at one edge to alternate sides or panels of the internal wall 2 and are attached at the other edge to the external wall 1 (Fig. 19b). Central pillar 67 rests on a circular horizontal plate 70 affixed thereto and resting on the floor. The top of the pillar has four radial arms 63, 64, 65 and 66 connected thereto, which extend at angularly spaced points and are affixed at their outer ends to vertical columns 43, 41, 101 and 100 respectively (Figs. 1, 2 and 3). Column 100 is a rod extending from the floor while columns 41, 43, 101 are formed of pairs of parallel spaced plates attached to the cylindrical outer supporting wall 1. The inner polygonal wall 2 is braced by radial vertical webs 68 extending therefrom to the central pillar 67 at angularly spaced points (Fig. 2).

Rotatably mounted on the central pillar 67 is a hub 77a (Figs. 2, 9 and 10) from which radial spokes 77 extend and support a circular carriage 7. The carriage 7 is a casting having upper and lower decks joined inwardly to the spokes 77. On the carriage are mounted two series (inner and outer) of upper and lower die holders arranged in concentric circles about the central pillar 67. In each series, the upper dies 15 and 33 are mounted on and are movable with respect to the upper deck of the carriage and with respect to the lower dies; but the lower dies 16 and 17 are fixed on the lower deck of the carriage. The outer dies from tablets of the molding material. The inner dies press the tablets into desired form, for example, into buttons as will hereinafter be more fully explained.

To support the carriage revolvably, six tapered rollers 4 (Figs. 2, 6 and 17) are individually mounted on radially directed horizontal axles 6 (Fig. 17) rotating in ball bearings 4b supported in bearing blocks 4c that are, in turn, mounted on horizontal plates supported from the base.

Figure 6:
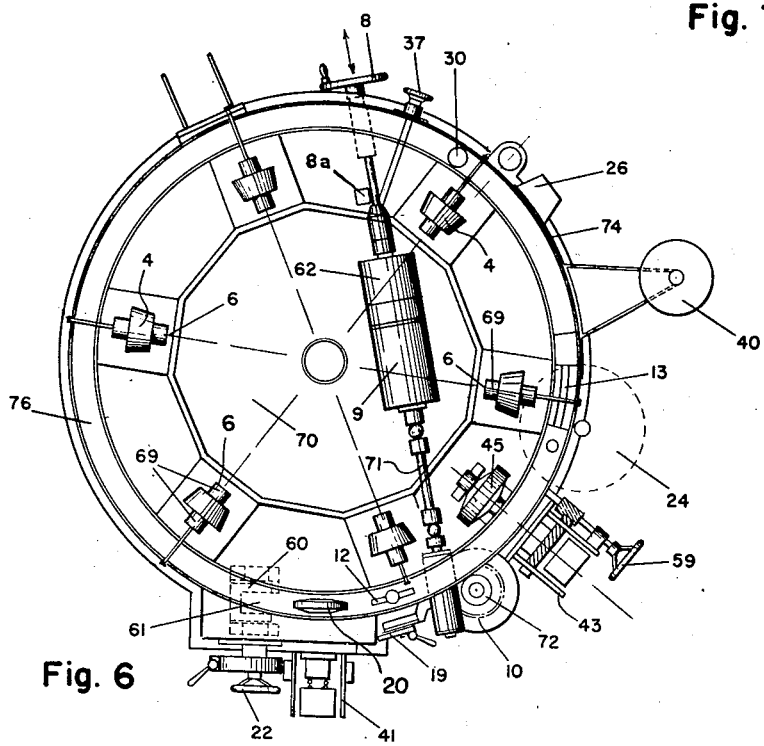
Fig. 6 is a sectional plan view at about line VI—VI of Fig. 2.
Figure 8:
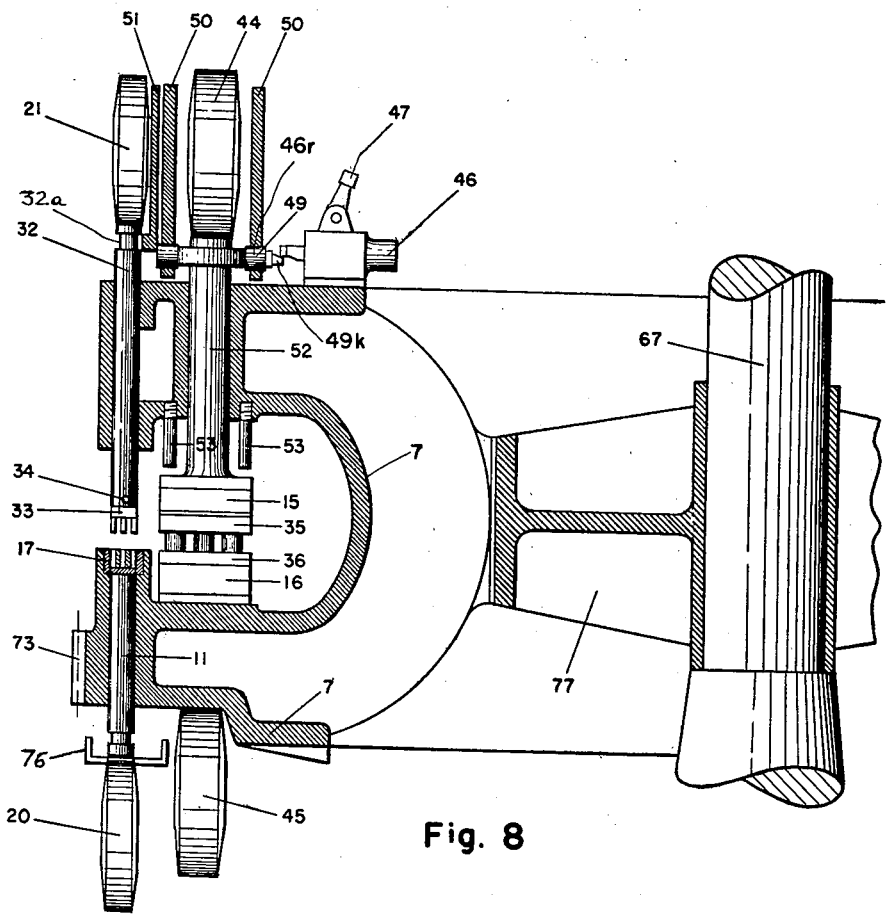
Fig. 8 is a vertical section view similar to the left side of Fig. 2, but on a larger scale and of only a portion of the mechanism shown in Fig. 2.

To drive the carriage, gear teeth 73 (Figs. 8 and 9) are cut on the periphery of the carriage which mesh with a pinion 72 on a vertical shaft which also carries at a lower level a driving gear 10 (Figs 6 and 17). Starting and stopping of the machine is controlled by a hand wheel 8 mounted on a horizontal axis. Rotation of the handle back or forward causes closing and opening, respectively, of a conventional electric switch. The switch controls an electric motor 62 which drives an articulated shaft 71 through a gear box 9. On the end of the shaft 71 is a worm which engages and drives the driving gear 10 and, hence, the pinion 7 is on the same vertical shaft. The motor and gear box are supported from the base plate 70 of the machine. To inspect the motor, the door plate 74 (Figs. 1 and 6), to which the operator's seat 40 is attached, may be removed from the casing 1.

STRUCTURE AND OPERATION OF DIES

(a) The tablet dies

Figure 30:
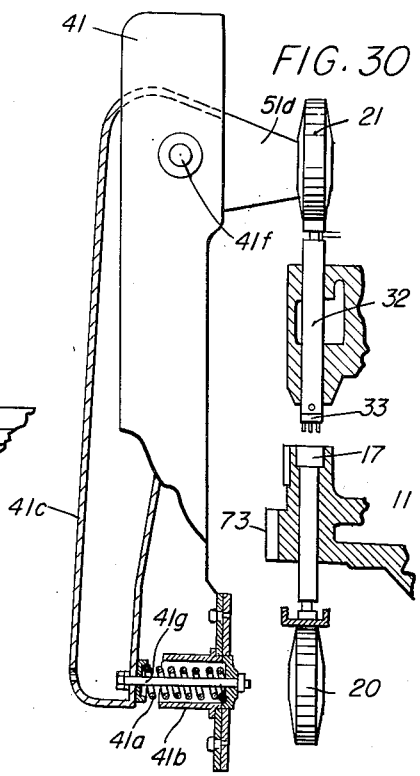
Fig. 30 is a fragmentary elevation view partly in section of the pressure adjusting means for the tablet dies.

For pressing together the outer tablet-forming dies, a pressure wheel 21 is mounted on the end of a horizontally extending arm 41d (Figs. 1 and 30) of a bell crank lever which is pivotally carried on a stud pin 41f mounted horizontally in the upper end of the frame column 41. Wheel 21 is positioned to press down successively, as the carriage 7 rotates, on one after the other of the tops of the vertical push rods 32 (Figs. 8 and 30) mounted on the upper deck of the carriage 7. The rods have secured on the lower ends of the upper tablet dies 33 by means of diametrical pins 34 (Figs. 14 and 25a–d) passing through the rods 32 and the shank of the die which extends up into the rod.

Pressure is applied to the wheel 21 by a horizontally positioned compression spring 41a coiled around a bolt 41g and pressing at one end against the lower end of the vertical arm 41c of the bell crank lever. The other end of the spring 41a presses against the column 41. The bolt 41g has nuts on each of its ends which extend through the column 41 and arm 41c to limit the movement of the bell crank and pressure wheel 21 brought about by the spring pressure.

To raise the upper tablet dies, the upper ends of their push rods 32 are each provided with a circular groove 32a which receives an out-turned or lateral lip on a circular cam rail 51 which runs around the machine and is supported fixedly on the machine frame by struts such as 63x depending from the radial arms 63, 64, 65 and 66. By the cam lip, the upper tablet die is raised after pressing a tablet under the pressure of the wheel 21.

The lower tablet dies are supported in the cavities provided in the top surface of the lower deck of the carriage 7. When pressure is applied by upper pressure roll 21 to form tablets between the tablet dies 33 and 17, strong support is needed for the lower tablet die. Such support is supplied by a lower supporting roller 20 (Figs. 8 and 17) which is adjustably mounted under the slide 76 in vertical alignment with the upper pressure roll 21.

Figures 7A, 7B:
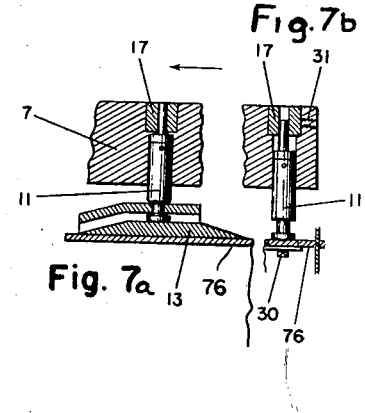
Fig. 7a is a fragmentary detail in vertical section along reference line VII of Fig. 9 of the pressing devices.
Fig. 7b is a view similar to 7a with the section at a different angle.

In order to eject the tablets from the lower die, a push rod 11 is slidably mounted in a bore under each table die. (See Figs. 7a and 7b.) The upper end of the rod is reduced and extends into the bottom of the die cavity. The lower end of the rod has a foot which moves along a circular stationary channel-shaped slide 76 located beneath and adjacent the periphery of the lower deck of the carriage 7. At one point around the slide 76, an inclined cam 13 is provided upon which the foot of the push rod 11 rides, causing the rod to rise and its upper end to eject the tablet.

The adjustable lower supporting roller 20 on a horizontal hub 20a is carried by a substantially horizontal lever member 60 (Fig. 17) pivoted at on end on a heavy pin 60p and bifurcated at its other end which rests on an eccentric 61. The eccentric is mounted on a horizontal adjustment shaft supported by bearings 22e on a horizontal frame plate 83. The end of the shaft extends outside the machine and has secured thereon a hand wheel 22 by a nut 22d. Turning the wheel 22 rotates the eccentric 61 to raise or lower the supporting lever 60. Such raising and lowering moves the roller 20, varying the position of the lower tablet dies 17 whereby the pressure between the upper and lower dies 17 and 33 is varied.

A lock wheel 22b is keyed on the outer end of the adjustment shaft for locking that shaft in adjusted position when a lock bolt 22f, turnable in a fixed lock member or axle box 22a, is tightened. The turning of the bolt 22f causes the lock wheel 22 and fixed lock member 22a to become frictionally engaged by the latter grasping or clamping the former.

(b) Feeding of molding powder and dosage regulation

For feeding the molding powder, a funnel or hopper 28 (Figs. 1, 3, 4a and 4b) is fixedly mounted adjacent column 43 and has its spout directed over the lower tablet-forming dies, hereinafter described. To insure even and complete filling of the mold cavities of the lower tablet-forming dies, a powder feed regulating device 23 (Figs. 4a and 4b) is fixedly located at one side of the spout of the funnel, in the direction the carriage 7 is moving. This regulating device has curved vertical walls spaced apart at least approximately equal to the distance across the dies measured radially of the machine, the curvature of the walls being about the hub 67 of the machine. Two vertical partitions extend inwardly, oblique to said walls at spaced points, to push the powder from one side to the other between the walls to insure filling of the mold cavity over its entire area. At that end of said device, which is opposite the spout of the delivery funnel, the walls extend outwardly at an angle over a downwardly and outwardly directed collecting funnel or chute 29 (Figs. 4a and 4b). The end of the inner wall 18 scrapes the surplus powder off the surface of the lower tablet-forming die and into the chute 29, from whence it is discharged into a container.

Figure 16B:
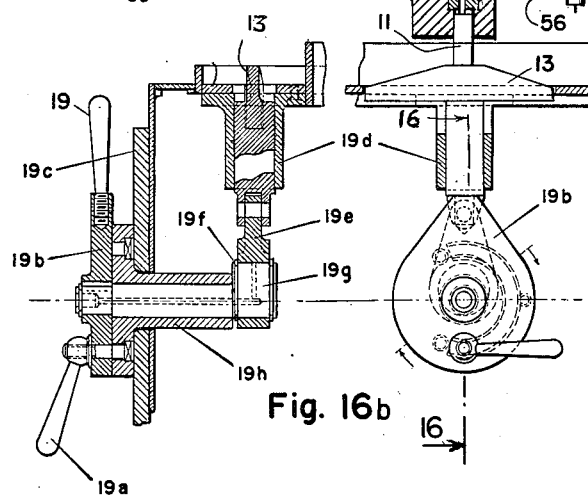
Figure 16A:
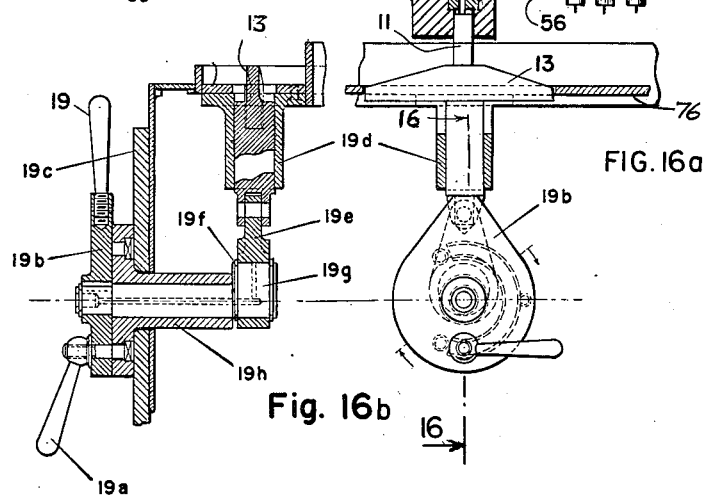
Fig. 16a is a detail view in side elevation partly in vertical section of the dosage regulating device.

To control the dosage, the level of the push rod 11 in the lower tablet die is adjustable. For that purpose, the cam 13 with which the foot of the push rod engages is supported from a vertically slidable member which slides within a fixed sleeve or housing 19d (Figs. 16a, 16b). The slidable member is pivotally connected at its lower end to an upwardly extending arm of a bearing ring 19f. In the bearing ring is an eccentric 19g which is mounted on a horizontal axle turnable in a horizontal sleeve or housing 19h. The sleeve 19h is supported from an intermediate plate 19c on the housing of the machine. An eccentric controlling member 19b with a socket for an operating handle 19 is mounted on the outer end of the axle and may be locked in adjusted position by a clamp handle 19a.

(c) *The button forming dies*

The upper button-forming die holders 15 have cylindrical shanks 52 slidably mounted in the upper deck of the carriage 7. To press down these upper die holders, an adjustable pressure roller 44 (see Figs. 8, 9, 11a, 15a, 15b and 29) engages successively the tops of the shanks 52 as the carriage revolves and brings them successively under the roller 44.

The roller 44 is mounted revolvably on the end of a horizontally extending arm 43h of a bell crank lever which is pivotally carried by a horizontal stud pin or bolt 43p mounted in the column 43. To press the roller 44, a compression spring 43c is coiled about a horizontal bolt 43k and presses at one end against the vertical bell crank arm 43a and, at the other end, against a nut 43e integral with a horizontally adjustable sleeve 43d whose periphery has threaded engagement with a bearing 43f affixed to the column 43. On the outer end portion of the sleeve is affixed a gear 43g which is engaged by a pinion 59g on a manually operable horizontal adjustment shaft 59b supported in bearings on the column 43. A hand wheel 59 is on the end of the shaft 59b for turning the shaft.

On rotation of the hand wheel 59, the pinion, gear and sleeve are caused to rotate. The sleeve moves axially by reason of its threaded engagement with the bearing 43f in the column and, hence, pivots the bell crank through the pressure of spring 43c, causing the roller 44 to be moved.

To raise the upper button-forming die holders 15, a pair of diametrically opposite pins extend out from a collar 39 (Fig. 9) affixed on the upper end of each of the shanks 52. On each pin is an anti-friction roller bearing 49. These roller bearings ride on the top surfaces of a pair of concentric cylindrical cam rails 50 supported by the frame arms 63 and 64 on opposite sides of the shanks 52.

Figure 11A:
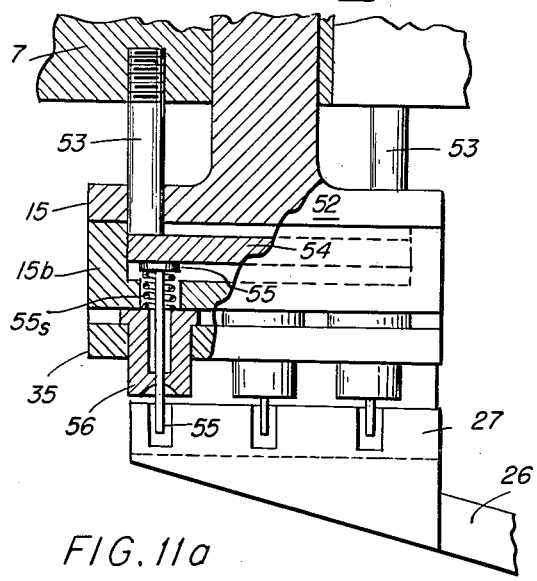
Fig. 11a is a vertical section view of the upper pressing punch also seen in Fig. 9 but on a larger scale.

The structure of the upper button-forming die may be observed in Fig. 11a. The foot of the die holder 15 has a longitudinal horizontal passageway through the bottom of which are bored three holes receiving three dies 56 whose bottom faces are shaped to form one surface of buttons. Heads on the dies keep them from falling through the holes. A backing member 15b is inserted resting on, or in back of, the die heads in the passageway to hold the dies in place in the foot. The upper surface of the backing member is recessed for reception of the movable ejecting plate 54. The ejecting plate 54 is engaged on its bottom by the head of an ejecting pin 55 which passes vertically through holes drilled in the dies 56 and holes aligned therewith in the bottom of the backing plate 15b. Coiled around the pins 55 beneath their heads are springs 55s whose lower ends rest on the top of the dies 56 while their upper ends press on the under side of the pinheads.

The upper face of the ejecting plate 54 is engageable by guide-and-stop pins 53, a pair of each being associated with each die-holder shank on opposite sides thereof and passing through holes drilled through the top portion of the foot of the die holder. The pins 53 are screwed into tapped holes in the carriage 7.

Upon rising of the die-holder shank 52, the pins 53 penetrate the holder, stop the upward movement of the ejecting plate 54 and thus press it and the ejecting pins down (relative to the dies and die holder) removing the buttons from the upper die 56.

The lower button die is shown in plan in Fig. 26a and in section in Fig. 26b and comprises three button cavities in a die plate 36 secured by screws on a die block 16 affixed to the lower deck of the carriage 7.

The lower parts 15, 16 of the tablet and button dies are heated electrically by electric resistance elements therein which are connected by wires (see Fig. 2) to contact rings 78 above the hub 77a of the carriage spokes 77 and rotating therewith. Stationary brushes 79, supported from the axle 67, engage the rings and feed current from any suitable source to the brushes. The heat may be regulated by a thermostat and pyrometer.

(d) *Transfer of tablets to button dies*

For moving the tablets formed by dies 17 and 33, a horizontal rotary disc member 24 has extending radially from its periphery a plurality of fingers 24a (Figs. 1, 5, 10, 20a, 20b, 20c and 21). These fingers move over the lower tablet die as they rotate counterclockwise (Figs. 20, 21) and encounter the tablets after the latter have been ejected upwardly from the tablet dies and after the individual dies—successively—are carried by carriage 7 into the orbit of said fingers.

As the three tablets formed by each die come within the orbit of the fingers 24a, the tablets are engaged one after the other and together are slid in an arcuate path (see dotted lines in Fig. 21) over a stationary horizontal arcuate plate 42, one edge (which may be considered as the terminal edge) of which is radial. The orbits in which the tablets are moved by the fingers are coincident with the orbits of the three cavities in each button-forming die at the terminal edge of the slider plate 42.

The slider plate is supported from a vertical post 42a on the machine frame by a flange or peripheral band turned up from the outer arcuate edge of the slider plate. To guide the movement of the tablets in the desired arcuate path, three concentric, low, vertical plates or guiding walls 42', 42², 42³ are mounted on the top surface of the slider plate 42 in position, and of such extent that as the tablets come into the orbit of the fingers 24a each tablet will run into and be guided by one of the walls 42b. Their engagement with the guide walls occurs in succession with the wall 42³ farther from the center of the disc 24 engaging the innermost tablet first, and the nearest wall 42' engaging the outermost tablet last, when the die has moved through an arc of between about 5°–10°.

After the three tablets from a die have engaged the walls 42', 42², 42³, a finger 24a is then moved in its orbit to engage them, as shown in dotted lines in Fig. 21. That finger (as are all the fingers 24a, in turn) is caused to move at such time by a peg 38 standing up from the periphery of the carriage 7 high enough to engage the finger but not high enough to engage the disc 24.

The pegs 38 are arcuately spaced around the periphery of the carriage, there being one for each die.

After moving the finger and tablets, the pin slips by the inner end of the finger as the carriage continues in its rotation. The movement of the finger is at a more rapid rate than the carriage.

At the terminal edge of the slider plate, the tablets slide off and drop into the bottom button-forming dies 16 in position for subsequent pressing into buttons.

*(e) Maintenance and release of pressure on button dies*

When the button-forming dies come under the upper pressure roller 44 the carriage is supported at that point by a lower supporting roller 45 under the carriage. The roller is no a horizontal axle supported in bearings 69 (Figs. 19a and b) on a horizontal plate 75 of the machine frame between the inner and outer walls 2 and 1.

To maintain, for a predetermined time, the pressure of the upper button die on the tablet in the lower button die after pressure is applied by the roller 44, an automatic die locking device 46 is provided for each set of button dies, as will now be described. Extending radially inward of the machine and axially from the axle of the inner roller of each pair of the small supporting rollers 49 herein before described, for the upper button dies, is a latch keeper 49k. This keeper becomes engaged with a radially movable retractable latch nose 46n which slides in a horizontal passage in the housing of the locking device 46. (Figs. 22, 22a and 22b.) The nose is pressed by a spring 46a located in said housing, behind said nose toward the keeper 46k.

A pressing punch 52 of each upper button die is permitted to descend by the slope of its lifting cam 50, it is finally pressed down fully by large upper pressure roller 44. At the bottom of said descent the keeper 46k, having pushed back the latch nose 46n, is latched down by the nose as the nose moves forward over the keeper under pressure of latch spring 46s.

After the pressure has been maintained for a predetermined time—while the buttons are being heated and the carriage is being rotated—the latch is retracted. For that purpose a vertical releasing lever 47 is pivotally mounted on a horizontal pivot pin in a lug upstanding from the housing of the latch device 46. The lower end of the releasing lever extends into a slot in the latch 46n while the upper end carries an anti-friction roller engageable with a curved rail or releasing cam-track 48 which causes the releasing lever to pivot and pull the latch nose 46n against the force of spring 46s and from engagement with keeper 46k, thus unlocking the punch 52.

An automatic latch device is provided for each punch 52; but one lifting cam 50 and releasing cam 48 control all.

OPERATION

From the foregoing, the operation may be understood. The points in the rotation of the carriage at which the various actions occur may be comprehended by reference to the diagrammatic portrayal in Figure 12.

The powder is delivered at A from hopper 28 and levelled and the excess is removed at B, by the structure illustrated in Fig. 4b. The tablet die closes at C and the pressure is applied at D to the powder in the tablet molds to form the tablet. The carriage then rotates through more than 180° with the die closed but no pressure applied until the upper tablet punch 32 starts to engage the lifting cam at E. The cam raises the punch 32 and thus opens the tablet mold, and maintains it open at F, while the punch head rides along the top of cam 51.

Figure 9:
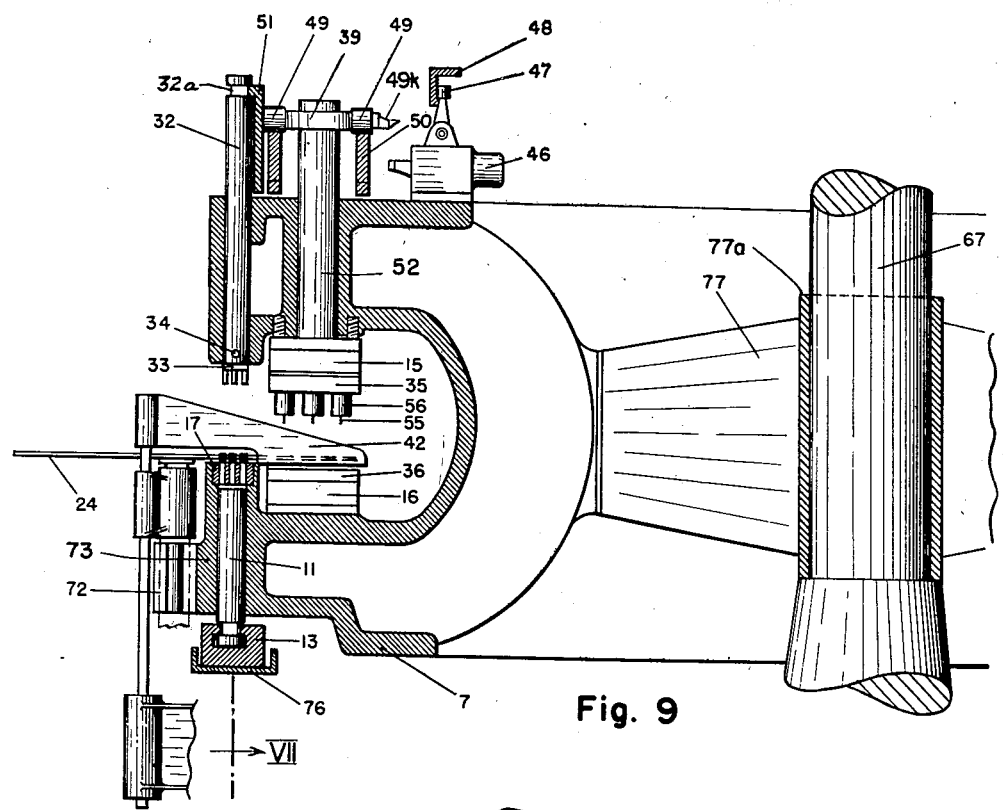
Fig. 9 is a view similar to Fig. 8 and with the parts in a different position and with some of the parts omitted.
Figure 10:
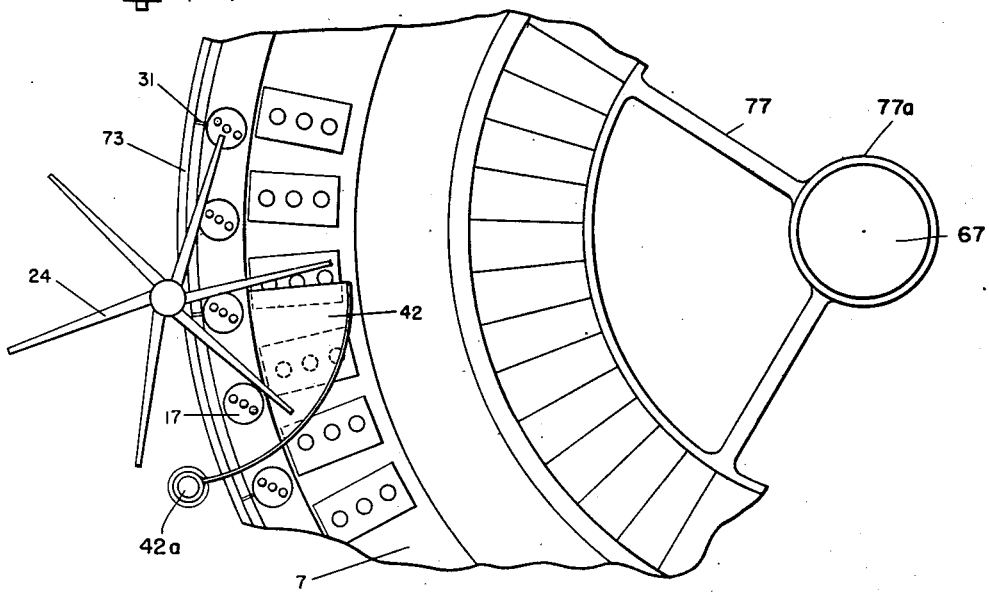
Fig. 10 is a plan view of the tablet slider plate and transporter as shown in Fig. 9 and elsewhere.
Figure 29:
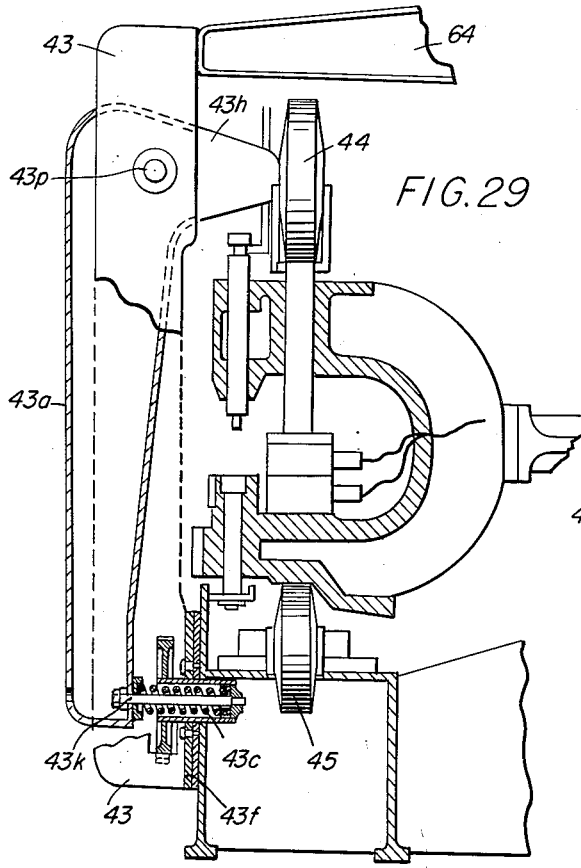
Fig. 29 is a fragmentary elevation view partly in section of the pressure adjusting means for the button dies.
Figure 13:
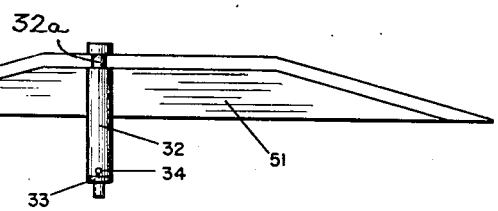
Fig. 13 is a detail view in side elevation of the guiding cams of the upper tablet punch.
Figure 14:
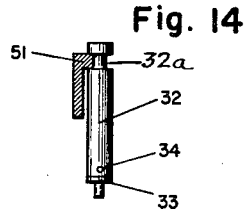
Fig. 14 is a left end view partly in vertical section of the parts in Fig. 13.
Figure 15A:
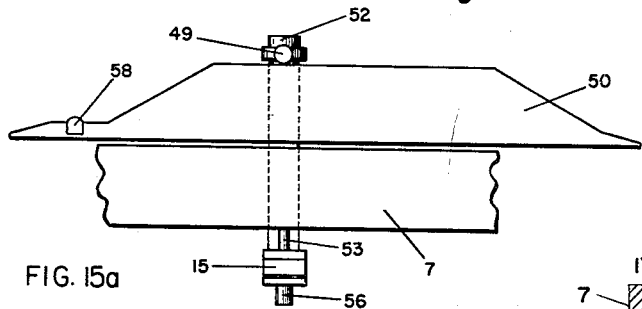
Fig. 15a is a detail view in side elevation of the pressing punch and its guide cam.
Figure 15B:
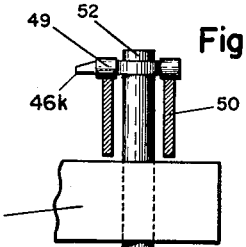

The tablets are transferred to the button molds at G by the devices shown in Figs. 10, 20a–c and 21 while the button dies are held open at J by the twin cams 50 (Figs. 9 and 13b).

The cams 50 close the button dies at L and pressure is applied at M by roller 44. The dies are also locked at that time by the locking device of Figs. 8, 9 and 22a–c. The button dies are held locked during rotation of the carriage through about a 200° arc, during which heat is applied by electric heating elements associated with each die and feed through wires connected to brushes 79 which rotate with the carriage and wipe over fixed commutator rings 78 on an insulating sleeve on the central axle 67, as shown in Fig. 2.

At the end of the heat run the locking device is unlocked by engaging the cam 48 at N and button dies are opened at H by twin cams 51. The lifting of the upper button dies causes removal of the buttons from their dies.

The buttons rise from the lower button molds with the upper molds 56 and are ejected by pins 55 as herein before described. In so doing the buttons may stick to or hang on the ejector pins. To remove them a plate 27 is provided on one side of a fixed chute 26 down which the ejected buttons slide. The plate has three vertical slots in its top edge to permit the passage therethrough the pins 55 as the carriage moves them past the plate 27. The plate 27 is located on the far side or wall of the chute (in reference to the direction of rotation of the carriage) so that any buttons hanging on the pins 55 will brush against the plate and be knocked off and will fall down into the chute 26, from whence they will slide away from the machine to be caught in any suitable container.

Figure 11B:
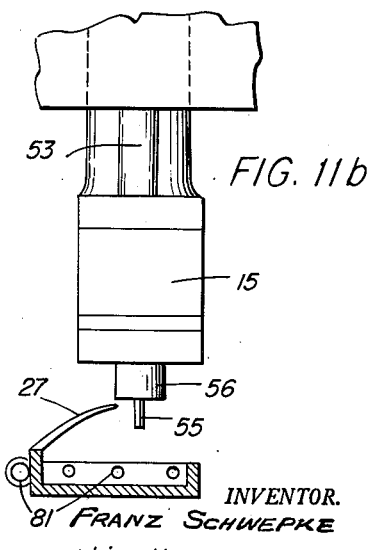

To prevent clogging of the buttons in the chute, an air blast through pipes and orifices 81 (Fig. 11b) is provided.

The operation is repeated as each set of tablet dies and each set of button dies completes 360° of rotation with the carriage 7. The several tablet dies and the several button dies are successively acted on in the same way so that on one rotation of the carriage all the dies will have been operated and will have functioned.

The operation is therefore continuous and at a high rate of productivity. The number of buttons or other molded articles produced by the machine per hour will be the product of the number of articles produced per mold on one impression times the number of molds times the revolutions per hour of the machine.

What is claimed is:

1. A machine for continuously molding plastic articles comprising a stationary frame, a continuously rotating carriage supported on said frame, a plurality of tablet-forming dies and a plurality of article-forming dies mounted on said carriage, pivotal supporting means for said carriage about which it and both the tablet-forming and article-forming dies rotate as a unit, said tablet dies having upper and lower parts, means to cause said tablet die parts to engage and disengage and to press them together at a predetermined point in the rotation of the carriage, said article dies having upper and lower parts, means to cause said article die parts to engage and disengage and to press them together at a predetermined point in the rotation of the carriage, means feeding molding powder to said tablet dies, means to transfer tablets formed by said tablet dies to said article-forming dies, and means to remove formed articles from said article dies.

2. A machine as claimed in claim 1 wherein the powder feeding means is fixed and extends over the path of said tablet dies to deliver powder as the tablet dies pass thereunder.

3. A machine as claimed in claim 2 having means to remove the excess of powder delivered to said tablet dies.

4. A machine as claimed in claim 3 having means to regulate the dose of powder held by said tablet dies.

5. A machine as claimed in claim 1 having means to regulate the dose of powder held by said tablet dies.

6. A machine as claimed in claim 1 having mens to remove the excess of powder delivered to said tablet dies.

7. A machine as claimed in claim 1 having means to remove the excess of powder delivered to said table dies, and having means to regulate the dose of powder held by said tablet dies.

8. A machine as claimed in claim 1 in which the tablet transferring means comprises fixedly mounted rotary device engaging formed tablets and moving them into the path of said article-forming dies.

9. A machine as claimed in claim 8 having fixed guide means providing a path for each tablet from a tablet-forming die cavity to an article-forming die cavity.

10. A machine as claimed in claim 1 in which the tablet transferring means includes fixed guide means providing a path for each tablet from a tablet-forming die cavity to an article-forming die cavity.

11. A machine as claimed in claim 1 in which the tablet transferring means comprises fixedly mounted rotary device engaging formed tablets and moving them into the path of said article-forming dies and means on the carriage moving said rotary device synchronously with movement of tablets from their dies.

12. A machine as claimed in claim 1 in which the tablet transferring means includes fixed guide means providing a path for each tablet from a tablet-forming die cavity to an article-forming die cavity, and a fixedly mounted rotary device engaging the tablets, means to move said rotary device synchronously with movement of tablets from the dies moving the tablets along said guide means.

13. A machine as claimed in claim 1 having means to regulate the amount of powder received by the tablet die, comprising a member forming a movable bottom for the tablet die, cam means fixedly located with respect to the carriage and engaged by said member, means to adjust the level of said cam means relative to the tablet die.

14. A machine as claimed in claim 1 having a curved cam track engaged by the upper die part to move it into and out of engagement with the lower die part.

15. A machine as claimed in claim 14 having fixedly located means on the carriage to adjust the amount of pressure applied on said tablet dies at said tablet-die pressure-point as said carriage passes thereunder.

16. A machine as claimed in claim 1 having means to lock said article dies in engagement during a portion of the rotation of the carriage.

17. A machine as claimed in claim 1 having fixedly located means on the carriage to adjust the amount of pressure applied on said article dies at said article-die pressure-point.

18. A machine as claimed in claim 17 having means to lock said dies in engagement during a portion of the rotation of the carriage.

19. A machine as claimed in claim 1 having means operated by raising of the upper die part to remove and discharge formed articles from the upper article die part automatically while the carriage continues in its rotation.

20. A machine for continuously manufacturing molded plastic articles comprising a carriage, a series of tablet-forming dies and a series of article-forming dies arranged in concentric circles on said carriage, means to close and to open said dies to form tablets and articles respectively, means to feed molding powder to the tablet-forming dies in continuous succession as they pass thereunder, means acting on all the tablet dies in succession to remove excess powder from each as they pass, transferring means attached to the machine for moving the formed tablets in continuous succession from the tablet dies to the article dies at a certain point in the rotation of the carriage, means to discharge the formed articles from the article dies in succession as they pass said discharging means.

21. A machine as claimed in claim 20 wherein the transferring means comprises a rotary device operated by the carriage as the formed tablets successively reach the transfer point.

22. A machine as claimed in claim 21 having guide means to move each tablet in a certain path during transfer.

23. A machine as claimed in claim 20 having pressure means acting in succession on said article dies after transfer thereto of said tablets.

24. A machine as claimed in claim 23 having locking means associated with each of the article-forming dies, means acting on said locking means in succession to automatically lock the article dies closed as they pass to maintain them under pressure, and releasing means acting on said locking means in succession after the completion of the molding of the articles.

25. A machine as claimed in claim 20 having locking means associated with each of the article-forming dies, means acting on said locking means in succession to automatically lock the article dies closed as they pass to maintain them under pressure, and releasing means acting on said locking means in succession after the completion of the molding of the articles.

References Cited in the file of this patent

UNITED STATES PATENTS

| | | |
|---|---|---|
| 1,026,682 | Komarek | May 21, 1912 |
| 1,846,999 | Eaton | Feb. 23, 1932 |
| 2,062,522 | Miller | Dec. 1, 1936 |
| 2,218,456 | Soubier et al. | Oct. 15, 1940 |
| 2,745,135 | Gora | May 15, 1956 |